M. A. MILLER.
CAKE BAKING PAN.
APPLICATION FILED MAR. 16, 1921.

1,388,364.

Patented Aug. 23, 1921.

Inventor:
Mary H. Miller,

Att'ys.

UNITED STATES PATENT OFFICE.

MARY A. MILLER, OF LANCASTER, PENNSYLVANIA.

CAKE-BAKING PAN.

1,388,364.  Specification of Letters Patent.  Patented Aug. 23, 1921.

Application filed March 16, 1921. Serial No. 452,780.

*To all whom it may concern:*

Be it known that I, MARY A. MILLER, a citizen of the United States, residing at Lancaster, in the county of Lancaster and State of Pennsylvania, have invented certain new and useful Improvements in Cake-Baking Pans, of which the following is a specification.

The present invention relates to domestic bake pans and more especially to pans for baking cake; particularly filler cake and layer cake.

Heretofore, when baking filler cake, it has been necessary to use two separate pans, one for the filler and the other for the cake to receive the filler—the same pan could not be used for both. Furthermore, in baking either the filler or the cake to receive it, there was difficulty in getting an even distribution of the heat. Consequently, the cake would frequently stick and burn at the bottom while the inside was still not sufficiently cooked. The main objects of the bake pan of this invention are to make it possible to bake both the filler and the cake to receive it in one pan, by simply using the pan in one position for one and then inverting it for the other; while at the same time insuring a perfectly even and uniform distribution of heat throughout the cake, whether filler, or cake to receive the filler.

In order to more fully disclose the construction, operation, and use of the invention, reference should be had to the accompanying drawings in which like reference characters designate the same parts in the several views.

Figure 1:
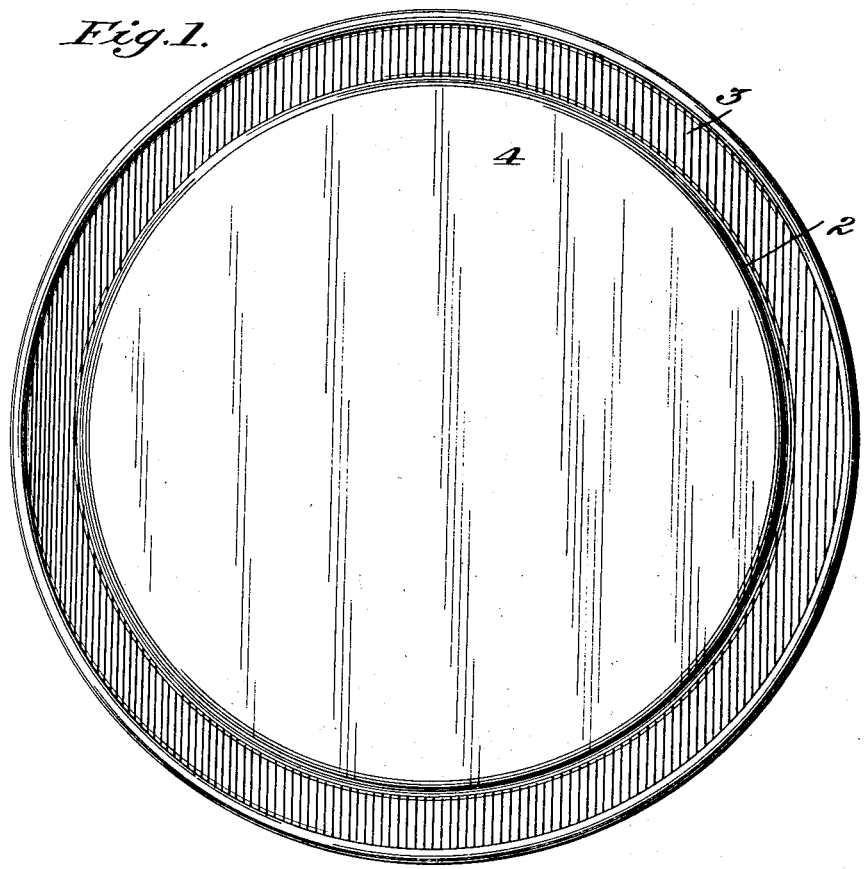
Figure 1 is a top plan view of the pan disposed for baking the cake to receive a filler.

The pan, in the particular construction illustrated, is substantially circular in outline and comprises two slightly divergent and substantially concentric walls 1 and 2, considerably spaced apart at their nearest ends and connected by the annular band 3, the main part of the bottom 4, being raised to the height of the inner wall and forming a disk which completely closes what would otherwise be a circular opening at the upper end of the inner wall (Fig. 1). This provides an annular U-shaped channel of considerable depth, to receive and bake the wall or rim of the cake which is to receive the filler or filling. The outer wall may be cylindrical, as shown, instead of inclined or divergent from the inner wall. By having one or both walls divergent, the space between them increases from the band 3 toward the opposite ends of the walls, making it very easy to remove the cake therefrom, as will be clear.

Obviously, the pan may be made in a wide variety of other shapes than the particular one shown. Likewise, the comparative lengths of walls 1 and 2 may be varied within wide limits, as may also the inclination of their walls, the distance between the walls, the width and shape of the bottom 4 and the cross-sectional shape of the band 3. Preferably, the bottom 4 is raised to the height of the wall 2, for its entire surface, as shown.

Figure 2:
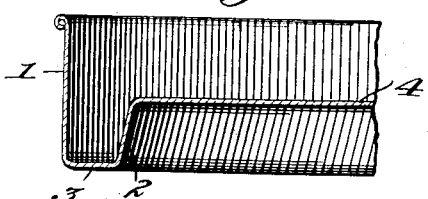
Fig. 2 is a fragmentary vertical cross-section through the same.
Figure 3:
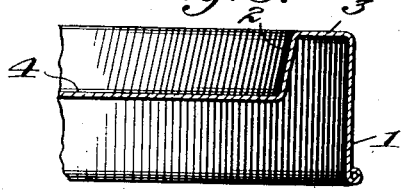
Fig. 3 is a similar view, with the pan inverted to bake a filler.
Figure 4:
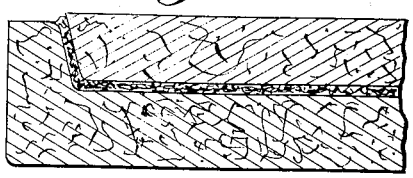
Fig. 4 is a fragmentary vertical cross-section through the filler cake, assembled.

Assume that a filler cake is to be baked. The pan is placed in the position shown in Figs. 1 and 2 and the cake dough poured in and it is put in the oven to bake. The only part of the pan in direct contact with the oven floor, if it is on the bottom of the oven, will be band 3. Since contact with the oven floor is what usually causes overheating and sticking, only that small portion will be in any danger in that respect. And that danger is practically eliminated by the thorough heating from side to side through that part of the cake, due to the walls 1 and 2, which are heated by the hot air of the oven and not by direct contact. The bottom 4 on which most of the cake rests, is not in contact with the oven floor but is heated by the hot air confined beneath it and within wall 2. So, due to the more even distribution of the heat and practical elimination of contact with the oven floor, there is no danger of uneven cooking or burning of the cake. After the cake to receive the filler is baked, the pan is cleaned, inverted, as in Fig. 3, and cake dough poured into the upper circular cavity or pan. In this case, no part of the pan containing cake dough touches the oven floor. The heat rises into the space previously occupied by cake and completely surrounds the circular filler cake. This filler of course, is of exactly the right size to fit the cavity in the first cake, as will be clear on reference to Fig. 4. Of course, when a layer cake is to be made, the separate layers are baked, one at a time, in the filler cake part of the pan, just as any other layer cake is made.

Preferably, as shown, the edge of wall 1 is rolled to strengthen it as a support, and provide a better resting surface, and enable it to be slid more easily over any surface on which it rests.

Preferably, too, the pan is made by stamping from one piece of metal, as shown in the drawings. It is obvious, however, that it may be made in several separate parts and soldered together. This might be done in various ways and it is not thought either necessary or desirable to describe or illustrate any of them, as they do not form any part of the present invention.

Changes may be made in the construction, arrangement, and disposition of the several parts of the invention, within the scope of the claims, without in any way departing from the field of the same and is meant to include all such within this application wherein only one preferred form has been disclosed by way of illustration.

Having thus described my invention, what I claim and desire to secure by Letters Patent is:

1. A bake pan for cakes having a portion of its bottom raised to produce a hollow or depression in the cake and provided with a channel surrounding said raised portion and adapted to produce a rim for the aforesaid depression.

2. A bake pan for cakes having a portion of its bottom raised to produce a hollow or depression in the cake and having an inner and an outer wall spaced apart and connected by the remaining portion of the bottom.

3. A bake pan for cakes having a portion of its bottom raised to produce a hollow or depression in the cake and having an outer and an inner wall spaced apart and connected by the remaining portion of the bottom, said walls being more widely spaced at the ends opposite those where they are connected.

4. A bake pan for cakes having a portion of its bottom raised to produce a hollow or depression in the cake and having an inner and an outer wall spaced apart and connected by the remaining portion of the bottom, one of said walls diverging from the other.

5. A bake pan for cakes having a portion of its bottom raised to produce a hollow or depression in the cake and provided with a channel surrounding said raised portion and adapted to produce a rim for the aforesaid depression, said pan, in one position, having a comparatively narrow supporting surface while in the inverted position being supported on its rim.

In testimony whereof I have signed my name to this specification in the presence of two subscribing witnesses.

MARY A. MILLER.

Witnesses:
 REBA P. MILLER,
 RUPERT G. MILLER.